(12) United States Patent
Arpin et al.

(10) Patent No.: US 10,689,301 B2
(45) Date of Patent: Jun. 23, 2020

(54) METHOD OF MAKING A POROUS FUEL CELL COMPONENT

(71) Applicant: DOOSAN FUEL CELL AMERICA, INC., South Windsor, CT (US)

(72) Inventors: Kevin A. Arpin, Coventry, CT (US); Patrick Michael Brown, Enfield, CT (US); Timothy William Patterson, Jr., West Hartford, CT (US)

(73) Assignee: DOOSAN FUEL CELL AMERICA, INC., South Windsor, CT (US)

(*) Notice: Subject to any disclaimer, the term of this patent is extended or adjusted under 35 U.S.C. 154(b) by 72 days.

(21) Appl. No.: 15/970,346

(22) Filed: May 3, 2018

(65) Prior Publication Data
US 2019/0337860 A1 Nov. 7, 2019

(51) Int. Cl.
*C04B 38/06* (2006.01)
*H01M 8/0234* (2016.01)
*H01M 8/0243* (2016.01)

(52) U.S. Cl.
CPC ......... *C04B 38/067* (2013.01); *H01M 8/0234* (2013.01); *H01M 8/0243* (2013.01)

(58) Field of Classification Search
CPC ..... B01J 21/18; H01M 8/0234; H01M 8/0243
USPC ................ 502/180, 416; 423/445 R
See application file for complete search history.

(56) References Cited

U.S. PATENT DOCUMENTS

| | | | |
|---|---|---|---|
| 3,175,918 A * | 3/1965 | McGahan | C04B 35/5611 501/82 |
| 3,205,043 A | 9/1965 | Taylor | |
| 3,291,872 A | 12/1966 | Brown et al. | |
| 3,342,555 A | 9/1967 | McMillan | |
| 3,479,423 A | 11/1969 | Wohlberg | |
| 3,832,426 A * | 8/1974 | Malthouse | C04B 35/532 264/29.4 |
| 4,188,279 A | 2/1980 | Yan | |
| 4,294,893 A * | 10/1981 | Iemmi | H01M 4/96 204/290.07 |
| 4,619,805 A | 10/1986 | Dias et al. | |
| 4,670,201 A | 6/1987 | Montgomery et al. | |
| 4,675,094 A * | 6/1987 | Kaminaga | C25B 11/035 156/242 |
| 4,851,264 A | 7/1989 | Banerjee et al. | |
| 4,897,170 A | 1/1990 | Chandramouli | |
| 5,190,696 A | 3/1993 | Fujii et al. | |
| 9,174,878 B2 | 11/2015 | Neumann | |
| 2002/0028385 A1 | 3/2002 | Reznek et al. | |
| 2003/0087095 A1 | 5/2003 | Lewis et al. | |

(Continued)

FOREIGN PATENT DOCUMENTS

EP 2703523 A1 3/2014
JP S6046905 A 3/1985
(Continued)

*Primary Examiner* — Patricia L. Hailey

(74) *Attorney, Agent, or Firm* — Carlson, Gaskey & Olds

(57) ABSTRACT

An illustrated example method of making a porous carbon composite includes mixing a carbon-based material, a binder and pore former particles to establish a mixture. The mixture is placed into a mold where it is subjected to pressure at an ambient temperature to form a compacted body. Subsequently, the compacted body is heated to a temperature that causes at least partial removal of the pore former particles to establish pores in place of at least some of the pore former particles.

19 Claims, 1 Drawing Sheet

(56) References Cited

U.S. PATENT DOCUMENTS

| | | |
|---|---|---|
| 2006/0015971 A1 | 1/2006 | Howard et al. |
| 2006/0159718 A1 | 7/2006 | Rathenow et al. |
| 2006/0202393 A1 | 9/2006 | Kortovich et al. |
| 2006/0239889 A1 | 10/2006 | Lewis et al. |
| 2007/0207917 A1* | 9/2007 | Sink .................. C08G 8/10 502/180 |
| 2014/0060727 A1* | 3/2014 | Stouffer ................ B01J 20/20 156/245 |
| 2017/0120223 A1* | 5/2017 | Sokolovskii ............ B01J 21/18 |
| 2017/0190629 A1 | 7/2017 | Lakrout et al. |

FOREIGN PATENT DOCUMENTS

| | | | |
|---|---|---|---|
| JP | S61120612 A | 6/1986 | |
| JP | 01270571 A | * 10/1989 | ............. C04B 35/74 |

\* cited by examiner

METHOD OF MAKING A POROUS FUEL CELL COMPONENT

BACKGROUND

Fuel cells are useful for generating electricity based on an electrochemical reaction. Typical fuel cell power plants include a cell stack assembly (CSA) with a large number of cells adjacent each other. Each of the cells in the CSA includes multiple layers or components, such as an electrolyte membrane, gas diffusion layers and flow field layers or plates.

The typical process for manufacturing carbon-based fuel cell components includes hot pressing a carbon or graphite powder and a phenolic resin. The hot pressing step cures the resin and imparts strength to the material for further processing. A drawback to this approach is that the mold used for this step has to be heated up and then the mold and the molded component material has to be allowed to cool down. This introduces additional time and expense into the manufacturing process. Another aspect of this approach is that it requires carefully controlling temperature and pressure to achieve the desired characteristics of the component.

SUMMARY

An illustrated example method of making a porous carbon composite includes mixing a carbon-based material, a binder and pore former particles to establish a mixture. The mixture is placed into a mold where it is subjected to pressure at an ambient temperature to form a compacted body. Subsequently, the compacted body is heated to a temperature that causes at least partial removal of the pore former particles to establish pores in place of at least some of the pore former particles.

In an example embodiment having one or more features of the method of the previous paragraph, the heating comprises subjecting the compacted body to a temperature that is greater than 800° C.

An example embodiment having one or more features of the method of any of the previous paragraphs includes curing the binder during the heating.

In an example embodiment having one or more features of the method of any of the previous paragraphs, the pore former particles comprise polyethylene.

In an example embodiment having one or more features of the method of any of the previous paragraphs, the pore former particles comprise polymethyl methacrylate (PMMA).

In an example embodiment having one or more features of the method of any of the previous paragraphs, the pore former particles comprise a wax.

In an example embodiment having one or more features of the method of any of the previous paragraphs, the pore former particles comprise ethylene bis stearamide (EBS).

In an example embodiment having one or more features of the method of any of the previous paragraphs, the pore former particles have a size in a range of 1 micrometer to 20 micrometers.

In an example embodiment having one or more features of the method of any of the previous paragraphs, the carbon-based material comprises at least one of carbon powder and graphite powder and the binder comprises a polymeric binder.

In an example embodiment having one or more features of the method of any of the previous paragraphs, the polymeric binder comprises phenolic resin.

In an example embodiment having one or more features of the method of any of the previous paragraphs, subjecting the mixture in the mold to pressure comprises applying a pressure above 3000 psi.

In an example embodiment having one or more features of the method of any of the previous paragraphs, subjecting the mixture in the mold to pressure comprises applying a pressure between 3000 psi and 6000 psi.

In an example embodiment having one or more features of the method of any of the previous paragraphs, subjecting the mixture in the mold to pressure comprises applying a pressure between 4000 psi and 5500 psi.

An example embodiment having one or more features of the method of any of the previous paragraphs includes removing the compacted body from the mold before performing the heating.

In an example embodiment having one or more features of the method of any of the previous paragraphs, the porous carbon composite is a fuel cell component.

In an example embodiment having one or more features of the method of any of the previous paragraphs, subsequently heating the compacted body causes at least one of (i) at least partial pyrolysis, (ii) at least partial evaporation, (iii) at least partial decomposition, and (iv) at least partial sublimation of the pore former particles.

In an example embodiment having one or more features of the method of any of the previous paragraphs, the pore forming particles have a size between 1 micrometer and 20 micrometers.

Various features and advantages of at least one disclosed example embodiment will become apparent to those skilled in the art from the following detailed description. The drawings that accompany the detailed description can be briefly described as follows.

DETAILED DESCRIPTION

Embodiments of this invention provide a technique of making a porous carbon composite, such as a fuel cell component, that increases efficiencies associated with making fuel cell components. By eliminating a requirement for heating and curing a resin during an initial press forming step, the time otherwise required to heat up and cool down a mold and the material is eliminated, which reduces cycle time and increases efficiencies. With embodiments of this invention, a room temperature or cold pressing technique forms a compacted or green body that has sufficient strength for further handling. Subsequently heating that body cures a binder and establishes a desired porosity of the final product or component.

Figure 1:
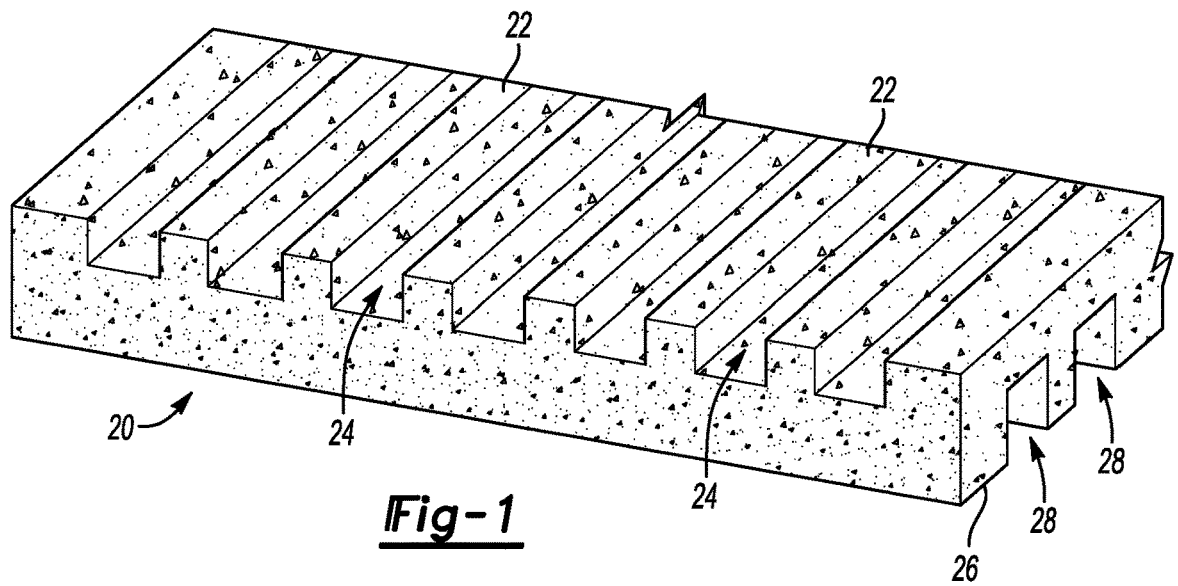
FIG. 1 diagrammatically illustrates an example embodiment of a porous fuel cell component designed according to an embodiment of this invention.

FIG. 1 diagrammatically illustrates an embodiment of a porous carbon composite, which in this example is a fuel cell component 20. For discussion purposes, a flow plate is used as an example porous component 20. This example includes a plurality of ribs 22 between flow channels 24 on one side of the component 20. Ribs 26 and flow channels 28 are situated on an opposite side of the component 20. The ribs 22, 26 and the channels 24, 28 are formed during a molding process in some examples. In other examples, the ribs 22, 26 and the channels 24, 28 are established by machining a blank plate or layer comprising the material of the component 20.

Figure 2:
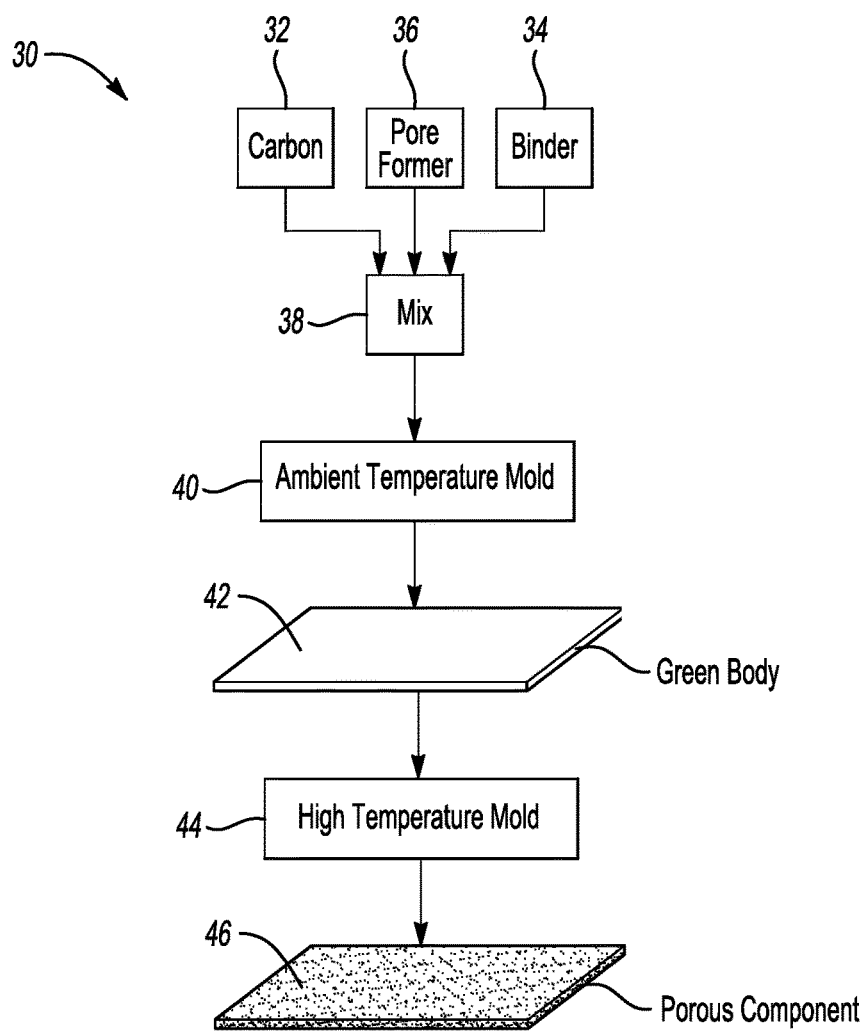
FIG. 2 schematically illustrates an example method according to an embodiment of this invention.

FIG. 2 schematically illustrates an example method 30 of making a porous fuel cell component 20 according to an embodiment of this invention. A carbon-based material 32, a binder 34 and pore former particles 36 are mixed together at 38 to establish a mixture. The carbon-based material 32 in some examples comprises carbon or graphite powder. The binder 34 in some examples comprises a polymeric resin, such as phenolic resin, in powder form. The pore former particles 36 comprise at least one of polyethylene, polymethyl methacrylate (PMMA), a wax, ethylene bis stearamide (EBS), polyethylene glycol (PEG) and cellulose powder. The pore former particles 36 have a size between 1 micrometer and 20 micrometers.

In one example embodiment, the carbon-based material comprises graphite and is approximately 68 percent of the mixture. The binder comprises phenolic resin and is about 22 percent of the mixture. The pore former particles comprise polyethylene and make up approximately 10 percent of the mixture. The pore former particles may be about 5-30 percent by weight of the mixture and the binder may constitute about 10-25 percent by weight of the mixture. The balance of the mixture, depending on the selected amount of pore former particles and binder comprises the carbon-based material.

The mixture 38 is placed into an ambient temperature mold 40 where the mixture is subjected to high pressure, ambient temperature compaction to densify the material enough to impart strength to establish a green body or compacted body 42 that is capable of being handled and further processed. The pressure used within the ambient temperature mold 40 exceeds 3000 psi. In some embodiments the pressure is in a range from 3000 psi to 6000 psi. In the illustrated example, the pressure ranges between approximately 4,000 psi and 5,500 psi. Since the mold 40 does not have to be heated up, the compacted body 42 may be formed and removed from the mold 40 more quickly than if the mold had to be heated and subsequently cooled down. The time during which the material would otherwise have to cool is also saved.

The compacted body 42 including densified material, is placed within a high temperature mold 44 where the compacted body is subject to temperatures on the order of 800° C. Depending on the selected binder, the temperature within the mold 44 in several embodiments is greater than 800° C.

Because the compacted body 42 has already been densified and includes the pore former particles 36, there is less strict pressure control requirements while heating the compacted body 42 in the high temperature mold 44 compared to previous manufacturing techniques that monitored pressure to control porosity.

Heating the compacted body 42 within the mold 44 cures the binder, which may comprise phenolic resin. The high temperature within the mold 44 also at least partially removes the pore former particles 36 to to establish pores within the component body. At least some of the pore former particles are effectively eliminated from the compacted body in the high temperature mold 44 to establish a desired porosity of the porous component 46. The removal of at least a portion of the pore former particles 36 in some examples includes pyrolysis of those particles. In other examples, the pore former particles undergo at least partial decomposition, at least partial evaporation, or at least partial sublimation.

When the compacted body 42 is within the high temperature mold 44, the heat applied to that body carbonizes the material at the same time as causing the removal of the pore former particles.

In one example embodiment, the pressure applied in the ambient temperature mold 40 is 4300 psi and the resulting porosity of the porous component 46 is approximately 57 percent. In another example embodiment including a mixture having the percentages of components described above (e.g., 68% carbon-based material, 22% binder, and 10% pore former particles), a pressure of 5200 psi is applied in the ambient temperature mold 40 and the resulting porosity of the porous component 46 is approximately 58.5 percent. Given this description, those skilled in the art will be able to select appropriate mixture compositions, pressures to use in an unheated mold or pressure and temperatures to use within a heated mold or press to realize a porous fuel cell component having the desired porosity and other characteristics needed for their particular situation.

Making porous carbon composites, such as those useful as fuel cell components, according to an embodiment of this invention reduces time and complexity when forming the composite, which provides enhanced manufacturing efficiencies.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of making a porous carbon composite, the method comprising:
   mixing a carbon-based material, a binder and pore former particles to establish a mixture;
   placing the mixture into a mold;
   subjecting the mixture in the mold to pressure above 3,000 psi at an ambient temperature to form a compacted body; and
   subsequently heating the compacted body to a temperature that causes at least partial removal of the pore former particles to establish pores in place of at least some of the pore former particles.

2. The method of claim 1, wherein the heating comprises subjecting the compacted body to a temperature that is greater than 800° C.

3. The method of claim 1, comprising curing the binder during the heating.

4. The method of claim 1, wherein the pore former particles comprise polyethylene.

5. The method of claim 1, wherein the pore former particles comprise polymethyl methacrylate (PMMA).

6. The method of claim 1, wherein the pore former particles comprise a wax.

7. The method of claim 6, wherein the pore former particles comprise ethylene bis stearamide (EBS).

8. The method of claim 6, wherein the pore former particles have a size in a range of 1 micrometer to 20 micrometers.

9. The method of claim 1, wherein
   the carbon-based material comprises at least one of carbon powder and graphite powder; and
   the binder comprises a polymeric binder.

10. The method of claim 9, wherein the polymeric binder comprises phenolic resin.

11. The method of claim 1, wherein the pressure is between 3000 psi and 6000 psi.

12. The method of claim 11, wherein the pressure is between 4000 psi and 5500 psi.

13. The method of claim 1, comprising removing the compacted body from the mold before performing the heating.

14. The method of claim 1, wherein the porous carbon composite is a fuel cell component.

15. The method of claim 1, wherein subsequently heating the compacted body causes at least one of (i) at least partial pyrolysis, (ii) at least partial evaporation, (iii) at least partial decomposition, and (iv) at least partial sublimation of the pore former particles.

16. The method of claim 1, wherein the pore forming particles have a size between 1 micrometer and 20 micrometers.

17. A method of making a porous carbon composite, the method comprising:
   mixing a carbon-based material, a binder and pore former particles to establish a mixture, wherein the pore former particles comprise ethylene bis stearamide (EBS);
   placing the mixture into a mold;
   subjecting the mixture in the mold to pressure at an ambient temperature to form a compacted body;
   subsequently heating the compacted body to a temperature that causes at least partial removal of the pore former particles to establish pores in place of at least some of the pore former particles.

18. A method of making a porous carbon composite, the method comprising:
   mixing a carbon-based material, a binder and pore former particles to establish a mixture;
   placing the mixture into a mold;
   subjecting the mixture in the mold to pressure at an ambient temperature to form a compacted body;
   removing the compacted body from the mold; and
   subsequently heating the compacted body to a temperature that causes at least partial removal of the pore former particles to establish pores in place of at least some of the pore former particles.

19. A method of making a porous fuel cell component, the method comprising:
   mixing a carbon-based material, a binder and pore former particles to establish a mixture;
   placing the mixture into a mold;
   subjecting the mixture in the mold to pressure at an ambient temperature to form a compacted body;
   subsequently heating the compacted body to a temperature that causes at least partial removal of the pore former particles to establish pores in place of at least some of the pore former particles, to thereby form a porous fuel cell component.

* * * * *